Jan. 28, 1969      N. J. PALMER      3,423,957
COUPLING
Filed Sept. 30, 1966
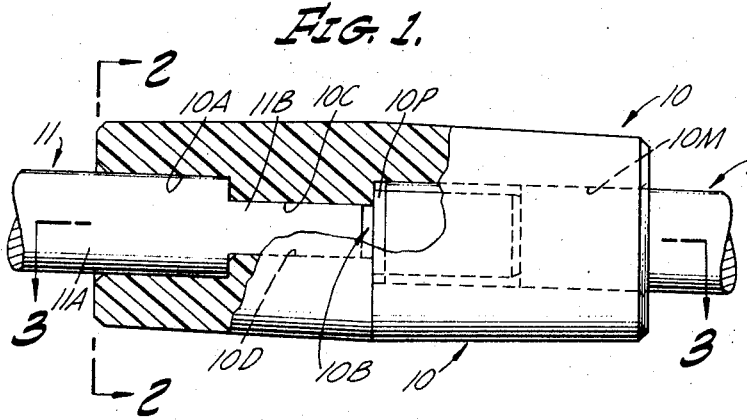
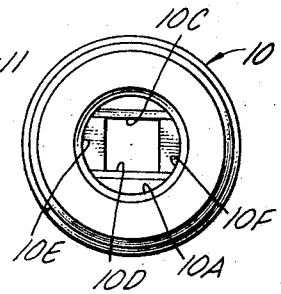
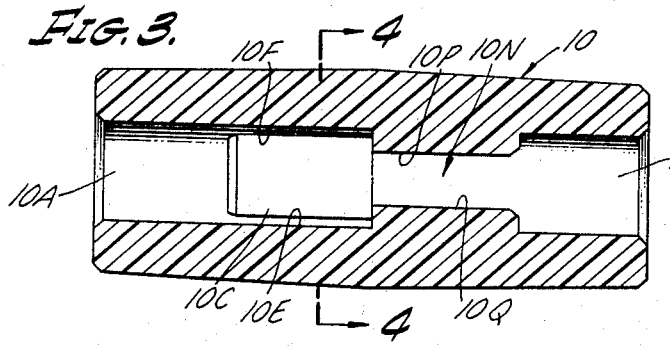
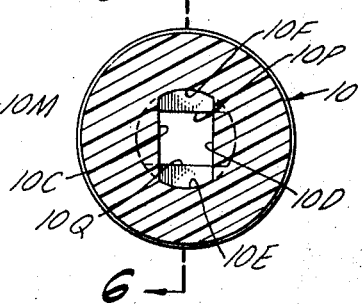
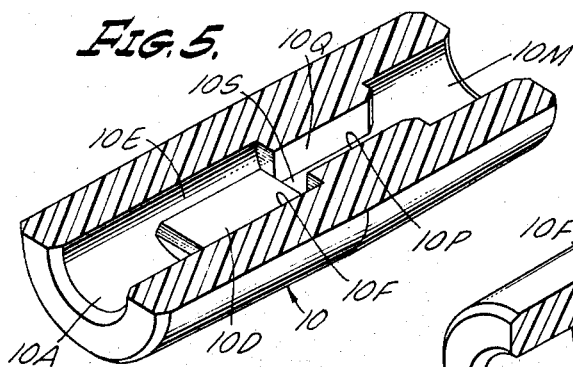
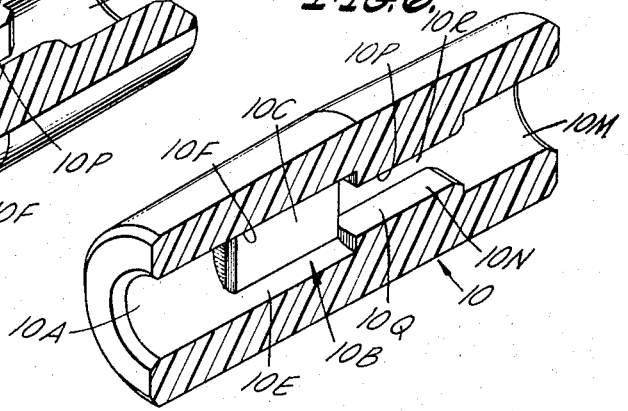
INVENTOR.
NORBERT J. PALMER
BY
*Lyon & Lyon*
ATTORNEYS United States Patent Office 3,423,957
Patented Jan. 28, 1969

3,423,957
COUPLING
Norbert J. Palmer, Playa Del Rey, Calif., assignor to Monogram Industries, Inc., a corporation of California
Filed Sept. 30, 1966, Ser. No. 583,252
U.S. Cl. 64—6                                       3 Claims
Int. Cl. F16d 3/52, 7/00

ABSTRACT OF THE DISCLOSURE

A single one-piece sleeve-like coupler accommodates, at each of its ends, a shaft. Each shaft has a pair of parallel flats defining a tongue and a shoulder portion. These shoulder portions are engageable with a corresponding internal shoulder portion in the sleeve and these flats are separated by curved walls each of which conforms in shape with a corresponding internal arcuate wall of the coupler.

---

The present invention relates to an improved coupling arrangement for coupling one shaft to another in driving relation.

In the coupling arrangement described herein, there is provided a cylindrical element adapted to accommodate ends of a driving and driven shaft in a unique manner. The coupling element described involves a cylindrical element adapted to accommodate ends of a driving and a driven shaft, such ends being uniquely formed and co-operating in a unique manner with portions in the coupling element for achieving a balanced assembled mass whereby the use of the coupling itself does not introduce unbalanced force problems particularly in those instances where the shafts are rotating at very high speeds.

It is therefore a general object of the present invention to provide an improved coupling arrangement which is simple and balanced dynamically so as to allow use with shafts rotating at high speeds.

Another object of the present invention is to provide an improved coupling arrangement involving a new interaction between shafts formed in a unique manner.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a view in elevation of a coupling element embodying features of the present invention;

FIGURE 2 is an end view of the same as indicated by the lines 2—2 of FIGURE 1;

FIGURE 3 is a view taken in a direction indicated by the lines 3—3 of FIGURE 1;

FIGURE 4 is a sectional view taken along the lines 4—4 of FIGURE 3;

FIGURES 5 and 6 are perspective views with a portion of the coupler being illustrated in section;

FIGURE 7 is a view illustrating the shape of the end of either the driving or the driven shaft.

The coupler 10 shown in the drawings may be of various materials including metal or plastic material, depending upon torque and stresses developed in coupling of two shafts. For example, the coupler may be made of material known as Delrin #500 formed integrally as presently described to accommodate adjacent ends of a driving and a driven shaft, the end of such driving shaft or driven shaft being illustrated in FIGURE 7.

In FIGURE 7 it will be observed that the shaft 11 representing either the driving shaft or the driven shaft, is formed in a unique manner. Instead of providing a single flat on the shaft, it will be seen that the shaft is formed with a generally rectangular end portion 11B which is, of course, integrally formed with the cylindrical or body portion 11A. This substantially rectangular end portion 11B may be formed by grinding two flats in the production of the parallel surfaces 11C and 11D. The rectangular portion 11B thus formed has its median point 11E coaxial with the axis of the circular or cylindrical portion 11A, the median point being defined as the point of intersection of the two diagonal lines joining opposite corners of the rectangular portion.

The coupler 10 snugly receives the end of each of two shafts such that when such shafts are inserted through opposite ends of the coupler 10, the major axis of the rectangular end portion 11B of one of such shafts is parallel with the major axis of the other shaft.

For these purposes it will be seen that the coupler 10, as illustrated, has cylindrical end portions 10A, 10M with the cylindrical end portion 10A being contiguous with an internal generally rectangular apertured portion 10B, such apertured portion 10B being defined by opposite parallel walls 10C, 10D and opposite curved walls 10E, 10F, the curvature of the walls 10E, 10F corresponding to the curvature of the inner wall of the outer cylindrical portion 10A. Likewise, the other coupler end having the cylindrical portion 10M has a generally rectangular portion 10N defined by opposite parallel spaced walls 10P, 10Q and oppositely spaced arcuate walls 10R, 10S, the curvature of the walls 10R, 10S, being the same as the curvature of the internal wall of the cylindrical portion 10M and also the same as the curvature of the internal wall of the other cylindrical end 10A. It will be seen that the parallel walls 10C and 10D which define the first-described rectangular apertured portion extend perpendicular to the walls 10P and 10Q which define the other rectangular apertured portion so that when the ends of the shafts are inserted through extending cylindrical portions 10A, 10M the shaft ends may be positioned as previously described such that the major axis or median point 10E of one shaft rectangular portion is parallel with the major axis of the other shaft rectangular portion.

Using this construction, rotative movement of the driving shaft is transmitted to the driven shaft and of importance is the fact that no set screws or locking elements are required which would destroy the symmetry of the coupler construction which, because of its construction, is balanced dynamically and hence it, or in combination with the shaft ends therein, produces relatively small, if any, unbalanced forces and this is particularly important when the coupler is being rotated at high rotational speeds.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. A one-piece coupler comprising a sleeve-like element; said element having a first and a second cylindrical tubular portion respectively at one end and at the other end of said sleeve-like element; said element having a first intermediate hollow portion adjacent to and contiguous with said first cylindrical tubular portion; said hollow portion having inner walls defining an inner opening which is generally rectangular in cross section; said element having a second intermediate hollow portion adjacent to and contiguous with said second cylindrical tubular portion; the last-mentioned hollow portion having inner walls defining an inner opening which is generally rectangular in cross section; the major axes of the first and second-mentioned rectangular openings extending generally perpendicular to each other; said rectangular openings having a pair of opposite arcuate walls of the same curvature as the curvature of the inner wall of said first and second cylindrical tubular portions.

2. An assembly which includes the coupler of claim 1 with a one-piece first shaft snugly extending into said first cylindrical tubular portion and said first hollow portion; a second one-piece shaft extending into said second cylindrical tubular portion and said second hollow portion, each of said shafts having an end portion which is generally rectangular in cross section contiguous with and adjacent to a cylindrical body portion; the generally rectangular end portion of each shaft has a pair of opposite curved walls conforming in curvature with and being of substantially the same area as a corresponding one of said arcuate walls with which it is engageable.

3. An assembly as set forth in claim 2 in which the end portion of an otherwise round shaft is formed with two flat portions having their planes extending substantially parallel.

References Cited

UNITED STATES PATENTS

| 1,073,690 | 9/1913 | Kerr | 64—9 |
| 2,132,765 | 10/1938 | Stoekle | 64—11 |
| 2,586,567 | 2/1952 | Scheele | 64—1 X |
| 2,725,188 | 11/1955 | Scott | 64—11 X |
| 2,872,225 | 2/1959 | Walker | 64—11 X |

HALL C. COE, *Primary Examiner.*

U.S. Cl. X.R.

64—11; 287—108